Aug. 31, 1943.  L. R. BOGARDUS  2,328,373
ELECTRIC DISTRIBUTION SYSTEM
Filed July 5, 1941
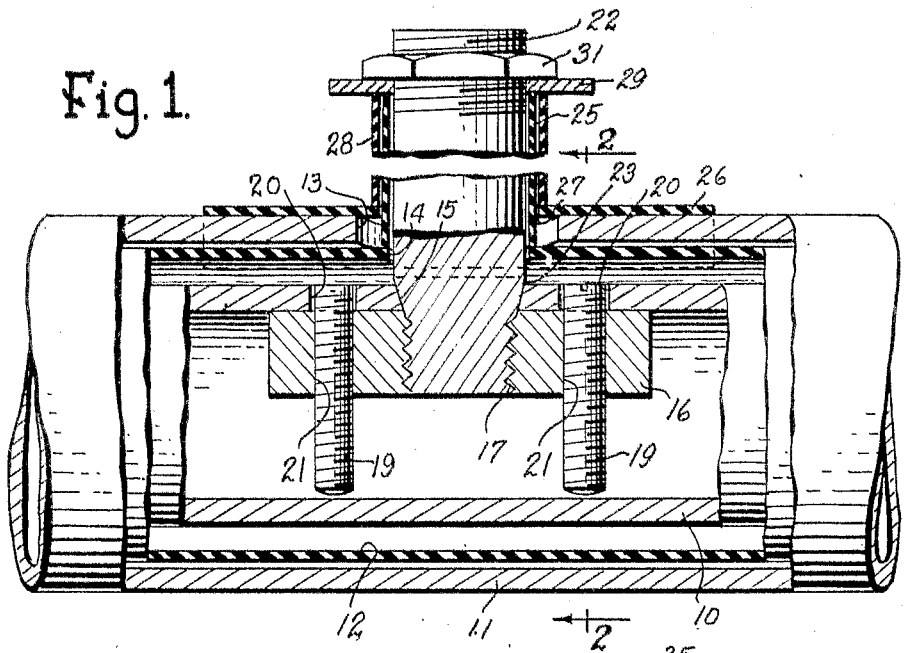
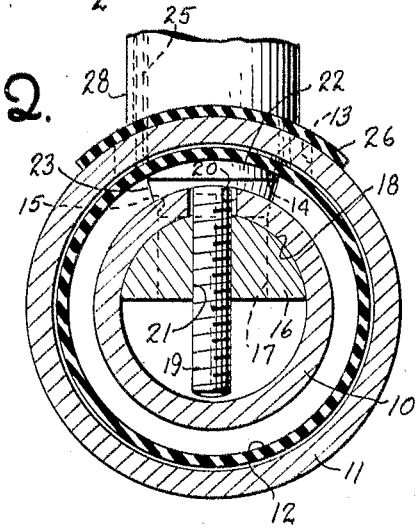
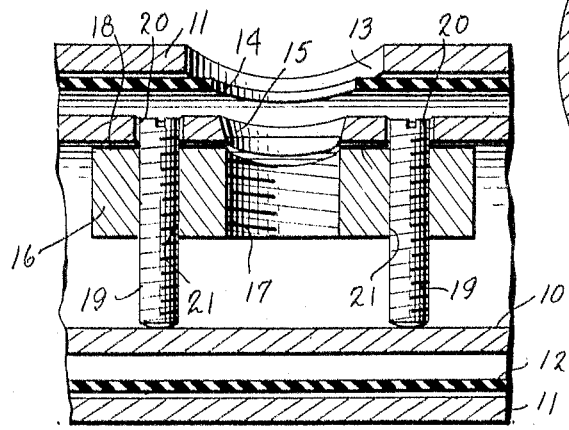
INVENTOR.
Leonard R. Bogardus
BY Sibbetts & Hart
Attorneys Patented Aug. 31, 1943

2,328,373

UNITED STATES PATENT OFFICE 2,328,373

ELECTRIC DISTRIBUTION SYSTEM

Leonard R. Bogardus, Grosse Pointe Farms, Mich., assignor to Packard Motor Car Company, Detroit, Mich., a corporation of Michigan Application July 5, 1941, Serial No. 401,166

8 Claims. (Cl. 174—71)

This invention relates to electric distribution systems of the type disclosed in my Patent No. 2,295,825, issued September 15, 1942, and more particularly to improvements in current tap devices for the inner tubular conductors of such bus systems.

It is an object of the invention to provide current taps for the inner tubular conductors of bus sections in which the conductors can be readily applied or detached after the section has been installed for use.

Another object of the invention is to provide sections of a bus system with interior contacts that are assembled therewith prior to installation and with which conductors can be associated as desired after the bus system has been set up for current distribution.

Still another object of the invention is to provide a tubular bus system with current taps that can be applied at a minimum cost.

A further object of the invention is to provide current taps for a tubular bus system in which a contact nut is anchored in a bus section, prior to installation, so that it can be readily engaged by a conductor after the system is assembled for current distribution.

Other objects of the invention will appear from the following description taken in connection with the drawing, which forms a part of this specification, and in which:

Fig. 1 is an elevational view of a central portion of one section of a tubular bus section, broken away and in section showing a current tap constructed in accordance with the invention;

Fig. 2 is a sectional view through the current tap portion of the bus system taken on line 2—2 of Fig. 1;

Fig. 3 is a sectional view similar to Fig. 1 with the contact means shown in its anchored floating position prior to the connection of a conductor member therewith.

In my pending application, previously referred to, there is illustrated a tubular bus made up of a plurality of sections secured together and having current taps leading therefrom for the purpose of distributing current from an A. C. single-phase circuit. In the present invention, a central portion of one of these bus sections and an improved form of current tap have been illustrated. The bus section consists of a pair of seamless copper tubes 10 and 11, the tube 10 being arranged within the tube 11 and connected with a source of electric current. The bus section also includes an insulating tube 12 arranged between the inner and outer copper tubes and formed of some molded and reinforced plastic, such as Micarta. The tubes 10, 11 and 12 can be assembled in the relation shown by suitable spacers of the type shown in my previously mentioned application. The tube 11 is formed with a radial tap opening 13, the insulating tube is formed with a radial tap opening 14 and the inner tube is formed with a radial tap opening forming a conical seat 15, such radial openings in the tubes being arranged in alignment and of decreasing diameter in the order of their description. These openings can be drilled and the surface forming the opening 15 can be machined conical after drilling.

Contact means, in the form of a nut 16, is supported to float in the interior of the live tube 10 so that the opening 17 therein will lie at least partially in alignment with the openings in the bus tubes. The nut is formed with a curved surface 18 that is complementary to the inner surface of the bus tube 10. In the direction of the axis of the opening 17, the nut is slightly less than one-half the diameter of the interior of the bus tube 10. Thus the nut can lie loosely within the inner tube 10 and can be inserted through an end of a section of a bus system prior to the time bus sections are installed for service.

The nut is located with its opening 17 in at least partial alignment with the openings in the bus tubes by piloted supporting means that may consist of a pair of threaded members 19. These threaded members 19 can be projected through pilot openings 20 drilled in the inner bus tube and screwed through openings 21 in the contact nut. The openings 20 are of larger diameter than the threaded members so that the members can float a limited extent, and as the nut is secured to such members it will float therewith. The threaded members can engage the bus inner tube diametrically from the openings 20 when they are screwed through the nut to thus act as a support for the nut when it is out of contact with the bus inner tube, such position being shown in Fig. 3 of the drawing. These members 19 are preferably of slightly greater length than the inside diameter of the inner bus section.

Each section of the bus system can be provided with one or more floating contact nuts, of the character set forth, prior to assembly into a distributing system so that conductor means can be applied or detached as desired. The conductor means can be in the form of a stud 22 having threaded ends. One end of the stud is projected through the openings in the bus tubes and such end is of reduced diameter so that it can be screwed into the opening 17 in the nut and it is provided with a conical shoulder 23 arranged to seat against the conical seat 15 in the inner bus tube. By screwing the stud into the nut while its conical shoulder is seated against the inner bus tube, the nut will be drawn tightly against the inner surface of the inner bus tube. Such engaging surfaces will provide contact that will transmit current from the inner bus tube to the stud through means of the threaded connection, and current will also flow to the stud through the contact formed by engagement of the conical shoulder of the stud with the inner bus tube seat 15.

A shield 26, formed of insulation material such as Micarta, is complementary in form to the outer bus tube and fits over the opening 13. This sleeve is formed with an opening 27, of smaller diameter than and aligning with opening 13, through which the stud 22 projects. An insulation tube 25 surrounds the stud and projects through openings 27 and 13, and the inner end of this tube is curved to fit the outer surface of insulation tube 12. Another insulation tube 28 surrounds the tube 25 and is curved at one end to fit against the exterior of shield 26 around the opening 27. The stud projects beyond both insulation tubes 25 and 28 and a bus plate 29 is screwed thereon and engages the tubes 25 and 28 to clamp them against the shield and the bus insulation tube. The bus plate is locked by a nut 31 screwed on the stud. The bus plate can be suitably perforated to receive conventional terminals for welding cables.

The current tap herein described is formed of parts that can be manufactured at low cost. The floating contact member allows the conductor stud to be readily applied to or removed from an intermediate portion of a bus section after the system has been installed. When there is no current requirement from a tap, a stud similar to stud 23, but formed of insulation material, can be applied to the contact nut.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A current tap for an intermediate portion of a bus section composed of inner and outer metal tubes separated by a tube of insulation, comprising a floating contact nut inserted inside the inner tube, said tubes having aligned radial openings therethrough, means piloted in said inner tube and supporting said nut adjacent the opening in the inner tube, and a conductor member projecting through the aligned tube openings and having a threaded end screwed into said nut, said conductor member securing the nut tightly against the inner tube when screwed therein.

2. A current tap for an intermediate portion of a bus section, composed of inner and outer metal tubes separated by a tube of insulation, said tubes having aligned radial openings therethrough and the opening in the inner tube being conical, comprising a floating contact nut inserted into the inner tube through an end thereof, said nut having a curved contact surface complementary to the inner surface of said inner tube, means supporting the nut and piloted in the inner tube whereby the nut will float in the tube with its opening partly in alignment with and adjacent the tube openings, and a contact member projected through the openings in said tubes and screwed into said nut to clamp it against the inner tube, said contact member having a conical shoulder engaging the portion of the inner tube defining the conical opening therein.

3. A current tap for an intermediate portion of a bus section composed of inner and outer metal tubes separated by a tube of insulation, comprising a loose contact nut in the inner tube, said tubes having radial aligned openings therethrough, supporting means piloted in said inner tube and fixed to the conductor nut, said means having limited movement relative to the tube to center the nut with its opening in at least partial alignment with the tube openings, and a conductor adapted to be projected through the tube openings and screwed into the nut to engage it with the inner tube.

4. The combination with a current conveyer tube having a lateral opening forming an outwardly flared conical seat, of a current tap therefore comprising a nut in said tube of a size larger than said opening and having a surface conforming to the inner contour of said tube, pilot means supporting said nut in limited floating position adjacent said opening, and a threaded conductor extending through said opening into said nut having a conical portion contacting with said seat, said conductor clamping said nut against the inner wall of the tube.

5. A current tap, for a bus section composed of inner and outer metal tubes separated by a tube of insulation, said tubes having radial aligned openings therethrough, comprising a floating contact nut inserted into the inner tube through an end thereof and having a surface curved to fit against the inner wall of said inner tube, a pair of threaded supporting members screwed through said nut, the inner bus tube having openings through which the threaded members are inserted and in which they are loosely retained, and threaded conductor means extending through the openings in the tubes and screwed into the contact nut, said conductor means drawing said nut tightly against said inner tube.

6. A current tap for an intermediate portion of a bus section composed of inner and outer metal tubes separated by a tube of insulation, comprising a contact member having a face formed complementary to the interior wall of the inner tube, said contact member being loosely inserted into the inner tube through an end thereof, and having a plurality of parallel openings therethrough, radial openings in the inner tube adapted to register with the openings in said contact member, threaded members insertable through the radial openings in said inner tube and screwed into the contact member openings, one of said threaded members extending through the outer tube and the insulation tube and the other threaded memberes being of greater axial length than the inner diameter of the inner tube and floating in the inner tube openings, the threaded member extending through the outer tube opening acting as a conductor and being operable from the exterior of the section to engage and secure the contact member tightly against the inner tube.

7. In a current distributing system, the combination with a current conveyer tube having pilot openings and a tap opening extending radially therethrough, a contact nut in the tube of a size larger than said opening and having a surface conforming to the inner contour of the tube, and threaded members screwed into the nut through the pilot openings in the tube, said members being of greater length than the interior diameter of the tube and of less diameter than the pilot openings, said members supporting the nut in spaced relation from the tube and with the nut opening disposed in at least partial alignment with the tap opening.

8. In an electric distributing system, the combination with a current conveyor tube having pilot openings and a tap opening extending radially therethrough for receiving a threaded conductor, a contact nut in the tube of larger dimensions than the tap opening and inserted through an end of the tube, and members insertable through the tube pilot openings for supporting said contact nut in the tube with its opening in at least partial alignment with the tap opening, said members being of greater length than the inner diameter of the tube and projecting into the tube pilot openings.

LEONARD R. BOGARDUS.